US007617519B2

(12) United States Patent
Williams

(10) Patent No.: US 7,617,519 B2
(45) Date of Patent: Nov. 10, 2009

(54) SYSTEM AND METHOD FOR INTELLIGENT RECOMMENDATION WITH EXPERTS FOR USER TRUST DECISIONS

(75) Inventor: Jeff Williams, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 10/803,364

(22) Filed: Mar. 18, 2004

(65) Prior Publication Data

US 2005/0210285 A1      Sep. 22, 2005

(51) Int. Cl.
*G06F 17/00* (2006.01)
(52) U.S. Cl. ......................................................... 726/1
(58) Field of Classification Search .................... 726/4, 726/1
See application file for complete search history.

(56) References Cited

U.S. PATENT DOCUMENTS

| 6,321,334 | B1* | 11/2001 | Jerger et al. ...................... 726/1 |
| 6,327,590 | B1* | 12/2001 | Chidlovskii et al. ............. 707/5 |
| 7,340,770 | B2* | 3/2008 | Freund .......................... 726/11 |
| 7,380,267 | B2* | 5/2008 | Arai et al. ....................... 726/1 |
| 2002/0002684 | A1 | 1/2002 | Fox et al. |
| 2003/0004909 | A1* | 1/2003 | Chauhan et al. ............... 706/45 |
| 2003/0140037 | A1* | 7/2003 | Deh-Lee ........................ 707/3 |

OTHER PUBLICATIONS

Johns (Paul Johns, Signing and Marking ActiveX Controls), Oct. 1996.*

Acd.Ucar.Edu ("Disabling Active Scripting in Internet Explorer", Aug. 2002.*

Schnoll, (Scott Schnoll, "Internet Explorer Security Zones", 2000).*

Walsh (Norman Walsh, "Getting Started with XML Programming", Apr. 1999).*

TechNet (Microsoft TechNet, "User Profile Structure" and "Appendix: Group Policy Setting for Roaming User Profiles", Mar. 2002).*

Resource Kit ("Microsoft Internet Explorer Resource Kit", Feb. 1998).*

Hipson (Peter Hipson, "Windows 2000 Registry", ISBN: 0782126154, 2000, p. 4-5 and 62-67).*

Heckermann, *A Tutorial on Learning With Bayesian Networks*, Microsoft Technical Report MSR-TR-95-06, 1995, available from http://research.microsoft.com/research/pubs/view.aspx?msr_tr_id=MSR-TR-95-06.

Tresp, *Committee Machines, in Handbook for Neural Network Signal Processing*, Yu Hen Hu and Jenq-Neng Hwang (eds.), CRC Press, 2001.

(Continued)

*Primary Examiner*—Nasser G Moazzami
*Assistant Examiner*—Peter Poltorak
(74) *Attorney, Agent, or Firm*—Shook, Hardy & Bacon LLP

(57) ABSTRACT

Methods and systems are provided for recommending to a user whether or not to trust content for potential downloading. A system is provided to compute logical default choices based on a user's prior choices, a user's profile and preferences and trust choices made by experts that the user trusts. The system preferably uses Bayesian analysis and other statistical techniques to assign values and weightings to different inputs which, in their aggregate, result in modification to the default option displayed in the user interface.

17 Claims, 9 Drawing Sheets

OTHER PUBLICATIONS

Walsh, *Introduction to Bayesian Analysis*, Lecture Notes for EEB-581, 2004, available from http://nitro.biosci.arizona.edu/courses/EEB581-2004/handouts/Bayesian.pdf.

Paul Johns, Signing and Morking Activex Controls:, Internet Publication, 'Online!, Oct. 15, 1996, http://msdn.microsoft.com/library/default.asp?url=/library/en-us/dnaxctrl/html/msdn_signmark.asp, 11 pages.

Alfarez Abdul-Rahman, "Supporting Trust in Virtual Communities", System Sciences, 2000, Proceedings of the 33rd Annual Hawaii International Conference on Jan. 4-7, 2000, Piscataway, New Jersey, USA, IEEE, Jan. 4, 2000, pp. 1769-1777.

Alfarez Abdul-Rahman, "A Distributed Trust Model", Proceedings of the New Security Paradigms Workshop. NSPW '97, Langdale, UK, Sep. 23-26, 1997, New Security Paradigms Workshop, New York: ACM, US, vol., Conf. 6.

Rohit Khare et al., "Weaving a Web of Trust", World Wide Web Journal, 'Online!, vol. ii, No. 3, 1997, http://www.w3journal.com/7/s3.rifkin.wrap.html, 19 pages.

\* cited by examiner

SYSTEM AND METHOD FOR INTELLIGENT RECOMMENDATION WITH EXPERTS FOR USER TRUST DECISIONS

FIELD OF THE INVENTION

This invention pertains generally to the field of computer systems and technology. More particularly, the present invention relates to computer security and aiding user trust decisions for downloading content.

BACKGROUND OF THE INVENTION

Privacy and trust have become more and more important to computer users over the last several years. As a result, operating systems have evolved to give users more granular control over trust decisions. When interacting with applications and services from unknown third parties using the Internet, users exercise a certain subjective or arbitrary amount of trust that these entities are safe. For example, a user may be hesitant to download content from an unknown source for fear of incurring damage to the computer through computer viruses. Users continually make trust decisions, and many users do so subjectively rather than objectively based on the current set of circumstances surrounding a download. Subjective choices regarding trust may not represent the user's best interest and may, ultimately, negatively impact their trust in the platform, as well as their user experience.

As an example, consider a user browsing the Internet using a web browser. Upon clicking a particular link from a site not previously visited, the content server associated with the link attempts to load an executable file to be run on the user's computer. Existing systems allow the user to choose, through a prompted graphical interface, whether or not to download the file. Often, one of the choices presented to the user is highlighted, and constitutes a default option. The default option is essentially a recommendation made by the system, which the user is free to avoid by choosing a different option. However, many users respond to such graphical interfaces by simply hitting the "Enter" or "Return" key, even without reading the prompt. This action by the user selects the default choice as set on the graphical interface. Research has shown that users tend to gravitate towards defaults. Choosing a non-default answer can have an effect on the user's perception of the program ("The default is wrong—that isn't what I want to do") or themselves ("How come the program's answer is different from mine? Am I doing something wrong?"). This, in turn, can reinforce inappropriate behaviors in many cases by putting a user at risk even in cases where their "deviance" from what is recommended is a positive.

Existing systems allow a user to configure downloading preferences, such that files will be downloaded without prompting the user, or such that files will not be downloaded at all. Any recommendation provided to the user will be the same, regardless of the user's past decisions. Thus, the recommendation for content from unknown site A will be the same recommendation for content from unknown site B. The existing systems are internal in that they consult information already present on the computer to establish a recommendation to a current user regarding whether or not to download the content.

BRIEF SUMMARY OF THE INVENTION

Embodiments of the present invention provide methods and systems for generating a recommendation for a user whether or not to trust content for potential downloading. A system is provided for computing default choices based on a user's prior choices, a user's profile and preferences and trust choices made by experts that the user trusts. The system, by way of example, uses Bayesian analysis and other statistical techniques to assign values and weightings to different inputs which, in their aggregate, result in modification to the default option displayed in the user interface.

The invention helps the user to make logical decisions around trust based on his past trust decisions and the decisions of others who they trust, through the use of an expert system. The expert system rates the context and provides weighting of previous decisions to set a default based on logical modeling. The system also allows a user to drill-down to provide the details utilized to recommend this default.

In one embodiment, a user interface is provided for facilitating recommending to a computer user a decision for downloading content, the user interface comprising a first trust option for allowing the user to cause the content to be downloaded, a second trust option for allowing the user to prevent the content from being downloaded, and a recommendation module for providing a recommendation for the user, the module taking as input for the recommendation a profile for the user and information about the content, wherein the recommendation comprises selecting as a default option the first trust option or the second trust option. In a further embodiment, the recommendation module further receives as input for the recommendation at least one expert profile associated with an at least one expert. In a further embodiment, the user interface further comprises an expert selection module for requesting the at least one expert profile to be transmitted to the module from a source external to the user's computer.

In another embodiment, a method is provided for recommending to a computer user a decision for downloading content, the method comprising reading a profile for the user, obtaining information about the content, and providing a recommendation as a default option to the user whether or not to trust the content, wherein the recommendation is based upon the profile for the user and the information about the content. In a further embodiment, the method further comprises updating the user profile based on a user decision whether or not to trust the content. In a further embodiment, the recommendation further is based upon at least one expert profile associated with an at least one expert. In a further embodiment, the method further comprises requesting the at least one expert profile to be transmitted from a source external to the user's computer.

In yet another embodiment, a computer-readable medium including computer-executable instructions is provided for facilitating recommending to a computer user a decision for downloading content, computer-executable instructions executing the steps of reading a profile for the user, obtaining information about the content, and providing a recommendation as a default option to the user whether or not to trust the content, wherein the recommendation is based upon the profile for the user and the information about the content.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems supporting recommending to a user whether or not to trust content for potential downloading will now be described with respect to preferred embodiments; however, the methods and systems of the present invention are not limited to recommending to a user whether or not to trust content for potential downloading. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
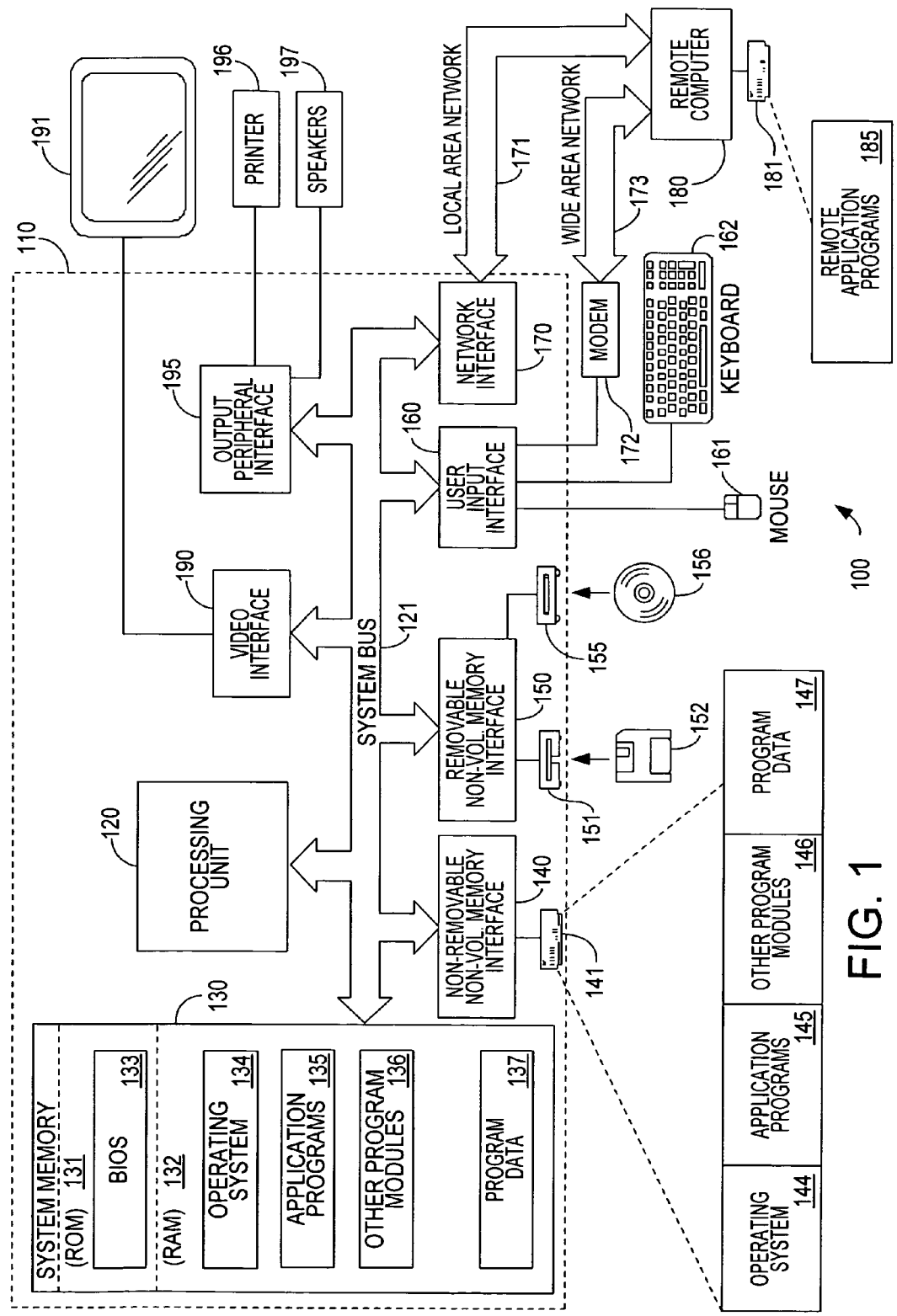
FIG. 1 is a simplified schematic illustrating an exemplary architecture of a computing device for carrying out an embodiment of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, SmartCards, SecureDigital cards, SmartMedia cards, CompactFlash cards and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. Alternatively, the computer 110 contains a wireless LAN network interface operating on, for example, the 802.11b protocol, allowing the computer 110 to connect to the LAN 171 without a physical connection. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. Alternatively, the computer 110 contains a wireless WAN network interface operating over, for example, the General Packet Radio Service (GPRS), allowing the computer 110 to connect to the WAN 173 without a physical connection. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Additionally, variations of the computer 110 may be incorporated into other exemplary systems for implementing the invention, such as cellular phones, personal digital assistants, and the like.

Figure 2:
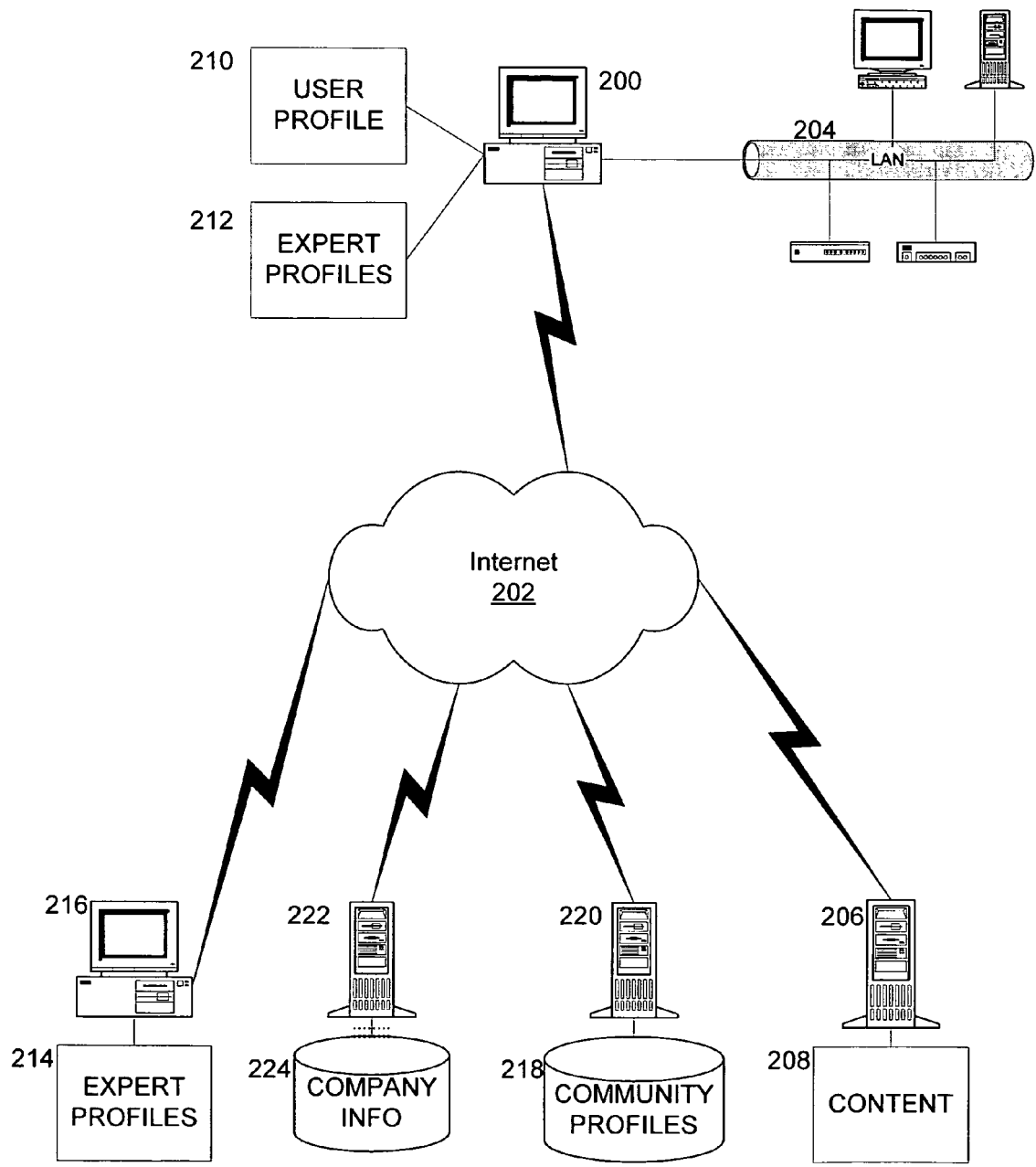
FIG. 2 is an exemplary network environment for carrying out an embodiment of the invention.

Turning attention to FIG. 2, a high-level network environment is shown wherein an expert trust recommendation system is utilized, in accordance with an embodiment of the invention. A user computer 200 communicates with other network resources over the Internet 202. Additionally or alternatively, the computer 200 communicates with other network resources over a local area network 204, either via wires or wirelessly through a wireless network communications protocol such as one of the 802.11 standard protocols. Typically, the computer 200 runs an application such as a web browser facilitating the viewing and downloading of content over the Internet 202. The application makes a request of a remote web server 206, which replies by attempting to send content 208 to the computer 200 over the Internet 202. Whether or not the content 208 is further transmitted to the computer 200 depends on the type of the content 208. For example, if the content 208 is a non-executable text file, such as a vanilla HTML file, then the computer 200 typically receives the content 208 automatically. For other types of downloadable content, such as executable files, files including executable macros, Java applets, etc., the application on the computer 200 presents the user with the option of receiving the content 208. The web browser also typically facilitates the viewing and downloading of content from a local hard drive or peripheral device such as a compact disc, hard drive, USB flash drive, etc.

In accordance with an embodiment of the invention, when the user is presented with the option of receiving the content 208, the user is further presented with a recommendation on which option—to receive the content 208 or no to receive it—to take. The recommendation generally takes the form of a highlighted interface button, such that the user hitting the "Return" or "Enter" key has the same effect as clicking on that button. The recommendation is thus a default choice, which the user must override manually by, for example, clicking on the non-highlighted interface button. To facilitate computing the default choice for the user and the particular content 208, an embodiment of the invention maintains a user profile 210. Embodiments of the invention additionally maintain a set of expert profiles 212. The user profile 210 and a local copy of the set of expert profiles 212 are preferably stored on the computer 200. The recommendation is generally computed mathematically as a function of the data in selected expert profiles, along with specific information regarding the content 208 and server 206. The method of computing the recommendation is more fully described below.

In embodiments of the invention, the user of the computer 200 obtains expert profiles from remote sources, such as over the Internet 202. The computer 200 can, for example, request the profile 214 of a remote user from the remote user's computer 216. Additionally, the computer 200 can request one or more profiles from a database of community profiles 218 by communicating with a community server 220. The community profiles 218 preferably comprise profiles of members of a particular community, such as an industry organization, interest group, subscribers to the same Internet Service Provider, etc. In this embodiment, the community server 220 additionally preferably maintains at least one profile representing the community as a whole, which is either a composite of the individual members' profiles or a profile representing the community's administrative body or both. In an embodiment of the invention, the community profile is an amalgam of the individual community member profiles representing the number of people (or percentage of people) trusting versus not trusting, along with a factor for the magnitude (numbers of participants, for example). In one embodiment, the community owner provides weighting to individual members based on the quality, consistency or "value" of their contributions. This weighting becomes a part of the community profile. When the computer 200 obtains remote user profiles from the community profiles database 218 or from a remote user 216, it preferably stores copies of the profiles locally with its expert profiles 212. In some embodiments, the user of the computer 200 is further able to transmit his user profile 210 to remote computers upon request. To facilitate the ease of sending and receiving profiles, the user profile 210 and expert profiles 212 are preferably stored as extensible markup language (XML) files.

In embodiments of the invention, the computer 200 communicates with a company data server 222 to obtain information about companies from a company information database 224. The company information obtained by the computer 200 is used, preferably in conjunction with the user profile 210 and expert profiles 212, to recommend whether or not to receive the content 208 from the web server 206. For example, if the content 208 or the web server 206 is associated with a particular company, the computer 200 queries the company data server 222 for information about the particular company. The company information database 224 stores this information, which includes, for example, the size of the company, whether the company is publicly traded, the country where the company is located, financial data about the company, etc. The computer 200 receives the company information and uses it to recommend whether to trust and receive the content 208.

Figure 3:
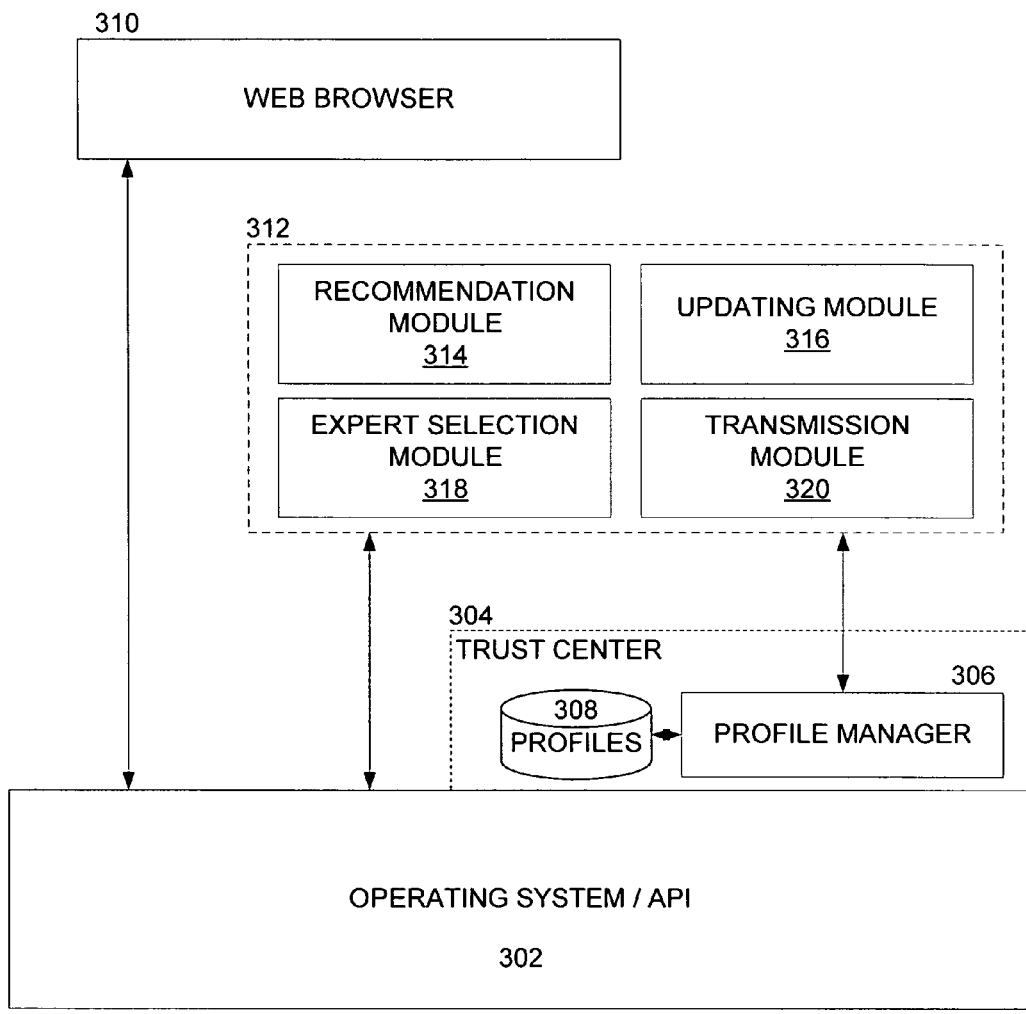
FIG. 3 is a an exemplary software component architecture capable of carrying out an embodiment of the invention.

In FIG. 3, a software architecture is shown for a set of components that execute on the computer 200 to recommend whether to trust content, in accordance with an embodiment of the invention. An operating system 302, such as an operating system from the Microsoft Windows family, runs on the user's computer 200. A trust manager 304 is associated with the operating system 302 to manage various security aspects in the operation of the computer 200. The trust manager 304 preferably includes a profile manager 306. The profile manager 306 manages and maintains a set of user and expert profiles 308. A user typically browses the Internet using a web browser application 310. In one embodiment, when presented with content for downloading that is of a potentially suspicious nature (e.g., an executable file from an unknown source), the web browser 310 communicates with the operating system 302 which in turn calls a set of modules 312 to make a recommendation and update the profiles 308. Alternatively, one or more of the modules 312 plug into the web browser 310, which directly invokes the one or more of the modules 312. In another embodiment, the set of modules 312 are included as components of the trust center 304. A recommendation module 314 communicates with the profile manager 306, either directly or via the operating system 302, to obtain profiles for use in computing a recommendation of whether to download the suspicious content. An updating module 316 updates the user profile with trust decisions made by the user. In embodiments, the updating module 316 updates the expert profiles in response to trust decisions made by the user or other information regarding the experts. An expert selection module 318 communicates with remote computers and requests expert profiles, which are received and stored with the other local profiles 308. A transmission module 320 sends the user profile to remote computers upon request.

Figure 4:
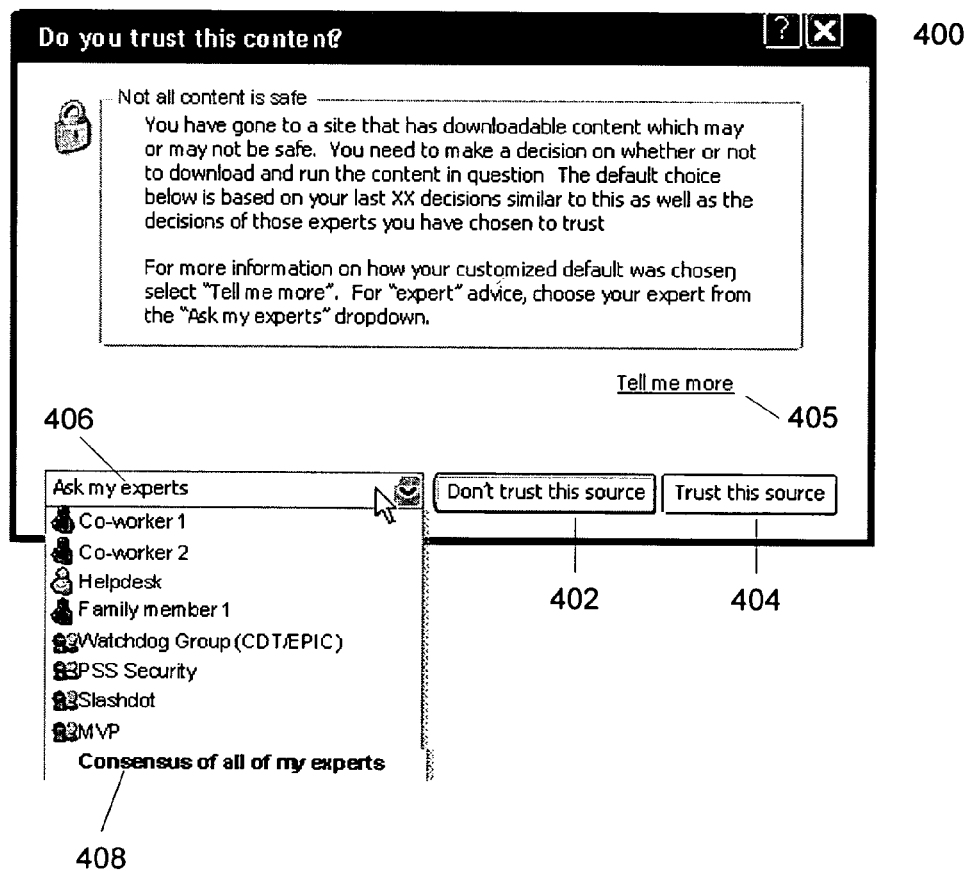
FIG. 4 is a diagram of an exemplary user interface for expert selection and trust recommendation, in accordance with an embodiment of the invention.

Turning to FIG. 4, an exemplary user interface is shown for a browser application that uses expert profiles to recommend whether to download content, in accordance with an embodiment of the invention. The user interface comprises a dialog box 400 with two buttons: a "Don't trust this source" button 402 and a "Trust this source" button 404. If the user clicks the "Don't trust this source" button 402 then the content is not downloaded, whereas if the user clicks the "Trust this source" button 404 then the content is downloaded. Exactly one of these buttons is highlighted as a default choice, such that when the user hits the "Enter" or "Return" key on his keyboard, the default choice is selected without clicking on the corresponding button. The default choice is thus a recommendation made by the computer. In the example shown in FIG. 4, the "Don't trust this source" button 402 is highlighted as the default choice, based upon the current user profile and the selected expert profiles. In addition to the buttons 402 and 404, the user interface 400 contains a "Tell me more" link 405, which provides, when clicked by the user, information on how the recommendation was computed, such as the weight given to each expert profile used in computing the recommendation.

The user interface 400 also preferably contains an expert selection box 406. By pulling down the expert selection box 406, the user is presented with a list of individual experts (i.e., other users or groups) which can be used in computing a recommendation. One option in the selection box 406 is a "Consensus" choice 408, which causes the recommendation to be computed based on the input of all the given experts. The consensus is preferably computed by weighting each of the individual experts according to a Bayesian weighting system. Exemplary systems using Bayesian analysis for producing a consensus of experts and updating expert weights are described in: Walsh, *Introduction to Bayesian Analysis*, Lecture Notes for EEB-581, 2004, available from http://nitro.biosci.arizona.edu/courses/EEB581-2004/handouts/Bayesian-.pdf; Tresp, *Committee Machines,* in *Handbook for Neural Network Signal Processing,* Yu Hen Hu and Jenq-Neng Hwang (eds.), CRC Press, 2001; and Heckermann, *A Tutorial on Learning With Bayesian Networks,* Microsoft Technical Report MSR-TR-95-06, 1995, available from http://research-.microsoft.com/research/pubs/view.aspx?msr_tr_id=MSR-TR-95-06, which are hereby incorporated by reference in their entirety for all that they teach without exclusion of any parts thereof. In one embodiment, the user manipulates the weightings of experts, or chooses a subset of experts to be used in computing a recommendation. The user chooses an individual expert from the selection box 406. By choosing an individual expert, the user is presented with the recommendation from that particular expert. Typically, an individual expert's recommendation is made from reading the local copy of the expert's profile. Alternatively, an expert who is online at a remote computer is queried for his profile, which is transmitted to the user's computer in an XML format. In one embodiment, the remote expert is notified when another user requests his profile, and must consent to allowing his profile to be transmitted to the user.

Figure 5:
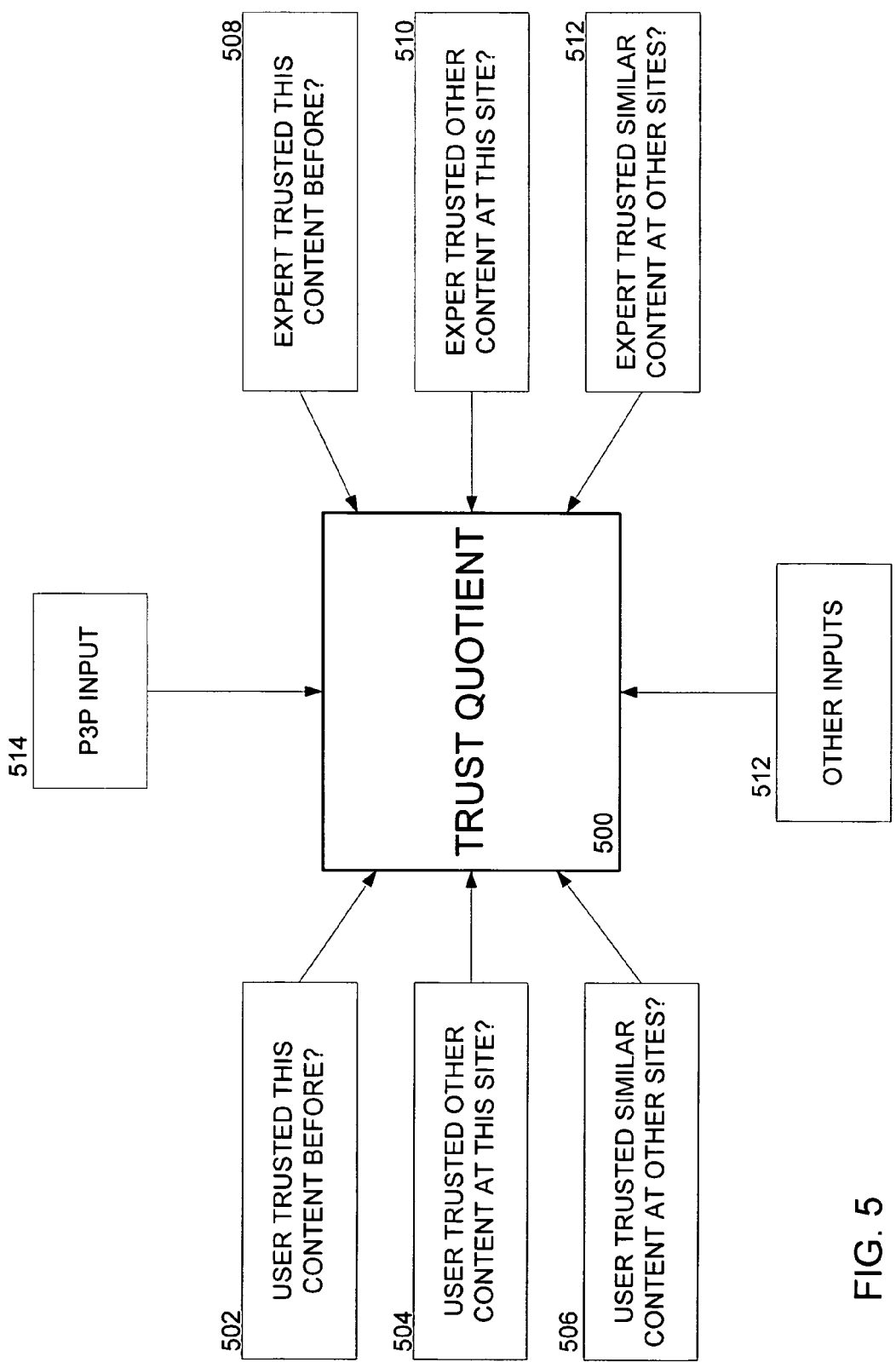
FIG. 5 is a diagram identifying factors used in computing a recommendation, in accordance with an embodiment of the invention.

The recommendation computed by the recommendation module 312 is shown in FIG. 5 in terms of a trust quotient 500, in accordance with an embodiment of the invention. The recommendation module 312 maintains a trust quotient 500 for particular content to be downloaded from a particular site. The recommendation module 312 computes and adjusts the trust quotient by comparing information about the content and the site with the user's profile, expert profiles, and other inputs. For example, the recommendation module 312 inspects the user's profile to see if: the user trusted this content before 502; the user trusted other content from the same site 504; the user trusted similar content from other sites 506, where similarity is defined by the type of content or other metadata about the content; and other criteria from the user profiles. If the user trusted this content, this site, or similar content, then the trust quotient is increased. If the user distrusted (e.g., previously affirmatively declined to trust) this content, site, or similar content, then the trust quotient is decreased. Similarly, the recommendation module 312 inspects the selected experts' profiles to see if: the experts trusted this content before 508; the experts trusted other content from the same site 510; the experts trusted similar content from other sites 512; and other criteria from the expert profiles. The recommendation module 312 further considers the input 514 of third party accreditation agencies, or a privacy policy published by the site, such as a privacy statement complying with the P3P standard. The recommendation further considers additional inputs 516, such as information about the company purveying the content to be downloaded. By comparing the metadata about the content to be downloaded with information in the user profile, expert profiles and other inputs, the recommendation module computes an appropriate trust quotient 500 for the content. In an embodiment of the invention, if the trust quotient 500 is above a threshold value, the content is recommended for downloading by setting downloading as the default choice. Otherwise, the content is not recommended for downloading, by setting the default choice accordingly. In some embodiments, the user by way of a preference setting establishes the threshold value.

In greater detail, the recommendation module accounts for both the context of the content to be downloaded along with previous behaviors of the user and the experts, in some embodiments of the invention. For example, if the context is whether or not privacy is at risk, a user is more likely to listen to and trust a neutral third-party such as the Electronic Privacy Information Center than a commercial entity. Also, trust changes over time and is affected by reinforcement; if a user listens to and trusts Source X and it turns out that choice was inconsistent with the user's desires, he is less likely to trust that source in the future. The recommendation module accounts for these tendencies by setting and adjusting weights used in computing the trust quotient for the content.

The weight initially given to an expert is generally assigned according to a pre-determined categorization. One example categorization, as used in an embodiment of the invention, is presented in Table 1.

TABLE 1

| Category | Weight in Trust Quotient |
|---|---|
| Self | Varies based on skill level |
| Family | Varies based on skill level |
| Trusted friend/colleague (expert) | High |
| Trusted friend/colleague (non-expert) | Medium |
| Co-worker (expert) | Medium |
| Co-worker (non-expert) | Low |
| $3^{rd}$ party expert with similar trust preferences | Medium |
| $3^{rd}$ party expert with dissimilar trust preferences | Depends on how dissimilar, diametric opposition would be high if reverse choice made, otherwise, medium-low. |
| $3^{rd}$ Party Attestation | Higher |
| $3^{rd}$ Party Trust Seal | Higher |
| Government entity | Depends on individual |
| WS-Privacy or P3P statement from site | Higher |

Additionally, the recommendation module factors previous trust choices made by the user. The recommendation module leverages mathematical weighting in some statistically valid manner based on previous trust choices. That is, when the user makes a trust choice, the system remembers that choice and uses it to update the weightings for future recommendations. Table 2 shows a simple example, with respect to a hypothetical user who is visiting a site for the first time. The site contains an ActiveX control for rendering particular information in a specific format. The site is operated by a publicly traded corporation based in the United States. The user has previously rendered files in the specific format on other sites and has installed other commercial off-the-shelf software from the developers of the specific format. The recommendation module recognizes these things and, based on previous trust decisions by that user, gives the scores shown in Table 2 in computing the trust quotient:

TABLE 2

| Criterion | Weight |
|---|---|
| Site has not been visited previously | −5 |
| Requires ActiveX control be installed | −5 |
| Previously loaded and trusted control | +5 |
| Control is from a company trusted in other contexts | +3 |
| Site is a corporation | +2 |
| Company is publicly traded | +0 |
| Company is in the United States | +0 |
| Anti-virus software was updated 1 hour ago | +3 |
| User is currently running with admin credentials | −5 |
| There is no corporate policy relating to this content | +0 |

Using the values in Table 2, a recommendation module employing a simple weighting algorithm adds the positive total of 13 with the a negative total of 15 for an overall total of −2. If the threshold for trust is set to 0, then the recommended action in this case is "Do not trust" and the appropriate button is highlighted in the user interface.

With respect to the individual table entries in Table 2, a preferred embodiment of the invention allows a user to configure the importance of individual criteria through a preference setting, so that, for example, being a publicly traded company is more important than being based in a particular country. Policy could be configured for corporate users that would either bar untrusted content or provide trust levels in aggregate from the company as a whole. Alternatively, policy could be configured to override individual preferences in the case of an enterprise configuration.

In an embodiment of the invention, a consensus of experts determines a recommendation for whether the user should download particular content. A recommendation module applies the various expert profiles to metadata about the content to be downloaded, giving appropriate weight to each expert based on the user's initial trust settings and subsequent recommendations. An example is shown in Table 3. In the example, a user visits the site http://support.microsoft.com and selects a download of an executable file (*.exe). The user is presented with a trust dialog box and chooses a "Consensus of all experts" option. The user has previously configured two experts: her cousin, who is an expert user; and the helpdesk of her office. Based on her confidence in the ability of each expert, the user has configured the experts with initial weightings of 10% for herself, 20% for her cousin, and 70% for her helpdesk. Several relevant criteria are reflected in the user's profile, such as that she has previously trusted *.exe files, and has trusted content from Microsoft corporation and from the domain *.microsoft.com. The cousin's expert profile reflects that he has distrusted *.exe files (by the negative value), has distrusted a similar website, but has previously trusted *.exe files from microsoft.com. The helpdesk's expert profile reflects that it has distrusted *.exe files, but has trusted the microsoft.com domain, has trusted companies with high fiscal solvency, has trusted companies with more than 5,000 employees, and has trusted domains over 10 years old. The totals for each expert are multiplied by their weights and summed together to obtain a weighted total. In this case, the total is greater than zero, and the recommendation module recommends downloading the content. Individual inspection of the experts reveals that the cousin would have recommended not trusting the content, since his weighted sub-total was less than zero. The user then has the choice of following this recommendation, or overriding it by choosing not to download the *.exe file. Once the user chooses, the weightings of the experts are updated using an algorithm such as those described in the above-cited references.

In a variation of this example, the helpdesk of the user's company has a policy that its trust decisions override the choices of all employees. Because the user is using a computer configured by that team, she is bound by its policy. In this case, the helpdesk policy supercedes the other experts and is applied directly without further interaction by the user. The company has a policy that downloaded executable files are not to be trusted. This policy is enforced by allowing the weights of individual criteria to be non-equal, and assigning to the "Previously trusted .exe" criterion the value negative infinity. This prevents recommending the downloading of executables, even if they are from an otherwise trusted source. When the user attempts to download the executable file, her computer follows the recommendation of the helpdesk and does not allow the download.

TABLE 3

|  | User | Cousin | Helpdesk |
|---|---|---|---|
| Weight of Expert | 0.1 | 0.2 | 0.7 |
| Previously trusted .exe | 1 | −1 | −1 |
| Previously trusted Microsoft | 1 |  |  |
| Previously trusted similar site |  | −1 |  |
| Previously trusted .exe from Microsoft.com |  | 1 |  |
| Has trusted *.microsoft.com | 1 |  | 1 |
| Has trusted companies w/high fiscal solvency |  |  | 1 |
| Has trusted companies >5000 employees |  |  | 1 |
| Has trusted domains more than 10 years old |  |  | 1 |
| Sub-Total | 3 | −1 | 3 |
| Weighted Sub-Total | 0.3 | −0.2 | 2.1 |
| Weighted TOTAL |  |  | 2.2 |

As previously mentioned, embodiments of the invention represent user and expert profiles as XML files. Metadata regarding content to be downloaded is further stored as XML files. An exemplary XML schema for representing content metadata is shown in Table 4.

TABLE 4

```
<?xml version="1.0" encoding="utf-16"?>
<xs:schema id="NewSchema" xmlns:xs="http://www.w3.org/2001/XMLSchema">
    <xs:complexType name="USER">
        <xs:sequence>
            <xs:element name="user_class" type="xs:string">
                <xs:annotation id="user_class includes values (self, family, friend, co-worker, 3rd party)"
                />
            </xs:element>
            <xs:element maxOccurs="3" name="user_attributes" type="xs:string">
                <xs:annotation id="(none, novice, expert)" />
            </xs:element>
        </xs:sequence>
    </xs:complexType>
    <xs:complexType name="URN">
        <xs:sequence>
            <xs:element name="tld" type="xs:string" />
            <xs:element name="domain" type="xs:string" />
            <xs:element minOccurs="0" name="subdomain" type="xs:string" />
            <xs:element maxOccurs="100" name="pages" type="xs:string">
```

TABLE 4-continued

```
        <xs:annotation id="example assumes a max of 100 pages tied to a particular
tld+domain+subdomain" />
      </xs:element>
    </xs:sequence>
  </xs:complexType>
  <xs:complexType name="CONTENT">
    <xs:sequence>
      <xs:element name="extension_type" type="xs:string" />
      <xs:element name="script_risk_level" />
    </xs:sequence>
  </xs:complexType>
  <xs:element name="HISTORY" type="xs:integer">
    <xs:annotation id="(0=site trusted, 1=site not trusted, blank is no history)" />
  </xs:element>
  <xs:complexType name="Owner">
    <xs:sequence>
      <xs:element name="industry" type="xs:integer">
        <xs:annotation id="utilize SIC code" />
      </xs:element>
      <xs:element name="fiscal_solvency" type="xs:string" />
      <xs:element name="country_code" type="xs:string" />
      <xs:element name="domain_create_date" type="xs:date" />
      <xs:element name="company_size" type="xs:string" />
    </xs:sequence>
  </xs:complexType>
</xs:schema>
```

Figure 6:
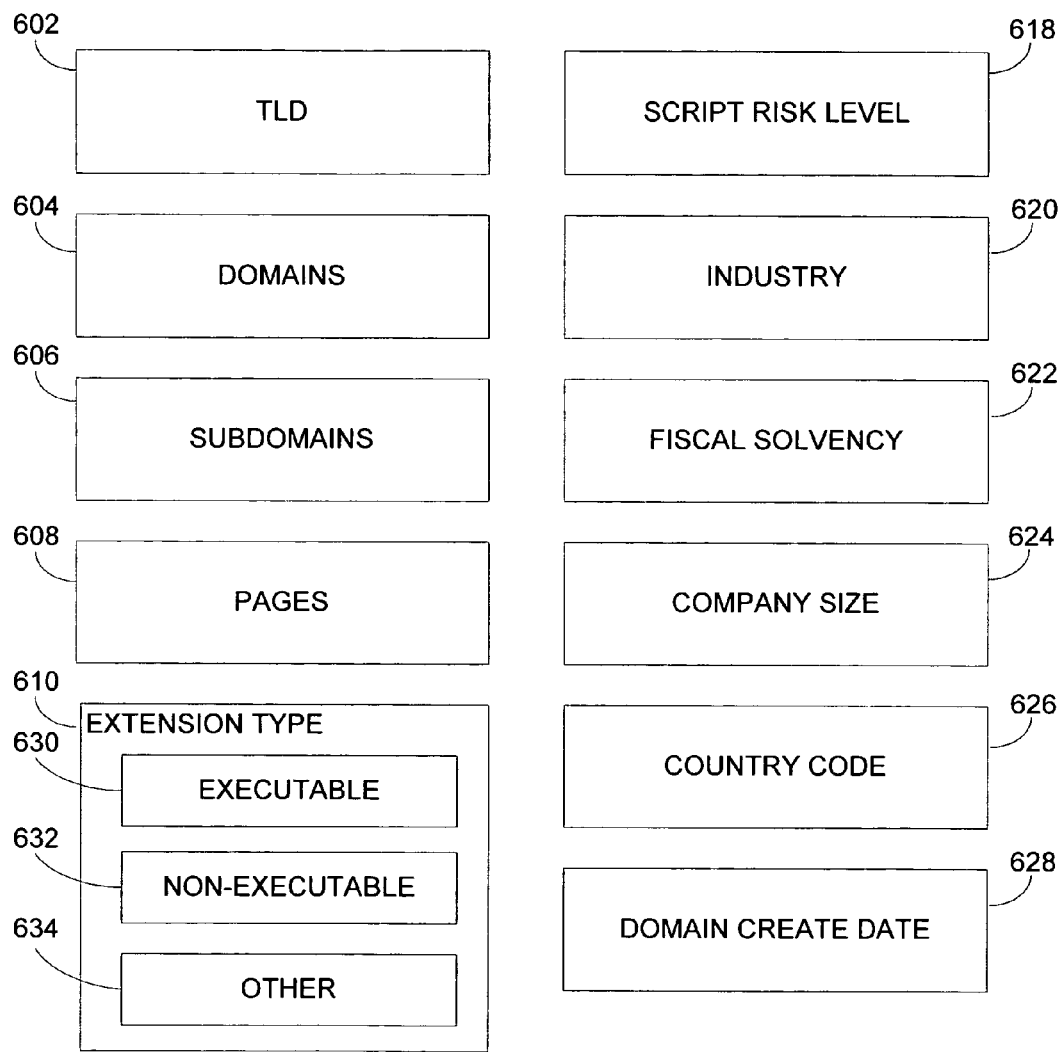
FIG. 6 is a data structure diagram illustrating fields of an XML schema for representing content metadata in accordance with an embodiment of the invention.

FIG. 6 illustrates a conceptualization of the schemas XML file for user and expert profiles. The schema includes the following elements: TLD 602, domains 604, subdomains 606, pages 708, extension type 610, script risk level 618, industry 620, fiscal solvency 622, company size 624, country code 626, and domain create date 628.

In greater detail, the TLD 602 element represents a top-level domain, constrained in some embodiments to .edu, .gov, .com, .net, org, .us and int. The domains 604 element and the subdomains 606 element are constrained in some embodiments to the requirements of IETF RFC 1101, and are not more than 24 characters. The extension type 610 element indicates one of three categories: executable 630, non-executable 632, or other 634. The executable 630 element indicates one of many file extensions used for a variety of executable programs. An exemplary listing of file extensions for executable files, as used in a Microsoft Windows environment, is shown in Table 5. An embodiment of the invention permits users to extend this list with additional file extensions.

TABLE 5

| File extension | File type |
| --- | --- |
| .ade | Microsoft Access project extension |
| .adp | Microsoft Access project |
| .bas | Microsoft Visual Basic class module |
| .bat | Batch file |
| .chm | Compiled HTML Help file |
| .cmd | Microsoft Windows NT Command script |
| .com | Microsoft MS-DOS program |
| .cpl | Control Panel extension |
| .crt | Security certificate |
| .exe | Program |
| .hlp | Help file |
| .hta | HTML program |
| .inf | Setup Information |
| .ins | Internet Naming Service |
| .isp | Internet Communication settings |
| .js | JScript file |
| .jse | Jscript Encoded Script file |
| .lnk | Shortcut |
| .mdb | Microsoft Access program |

TABLE 5-continued

| File extension | File type |
| --- | --- |
| .mde | Microsoft Access MDE database |
| .msc | Microsoft Common Console document |
| .msi | Microsoft Windows Installer package |
| .msp | Microsoft Windows Installer patch |
| .mst | Microsoft Visual Test source files |
| .pcd | Photo CD image, Microsoft Visual compiled script |
| .pif | Shortcut to MS-DOS program |
| .reg | Registration entries |
| .scr | Screen saver |
| .sct | Windows Script Component |
| .shb | Shell Scrap object |
| .shs | Shell Scrap object |
| .url | Internet shortcut |
| .vb | VBScript file |
| .vbe | VBScript Encoded script file |
| .vbs | VBScript file |
| .wsc | Windows Script Component |
| .wsf | Windows Script file |
| .wsh | Windows Script Host Settings file |

The non-executable 634 element indicates one of many file extensions used for a variety of non-executable files. Exemplary non-executable file extensions include .txt, .doc, and .htm. An embodiment of the invention permits users to extend this list with additional file extensions. The other 636 element indicates file extensions that are not included in the executable 632 or non-executable 634 file extension lists.

The script risk level 618 element indicates a risk level for indicating a level of risk associated with downloading the content. For example, in one embodiment, if the content to be downloaded manipulates only items on the displayed web page, it is assigned a script risk level 618 of "Low". If it manipulates by copying and pasting, it is assigned a script risk level 618 of "Medium". If it manipulates by trying to interact with the computer's file system, it is assigned a script risk level 618 of "High".

In an embodiment of the invention, the industry 620 element indicates the industrial category for the owner of the site. For example, the industry 620 element is set to one of:

automobile, chemicals, computers/electronics, energy, entertainment/media, finance, health, telecommunication, travel/tourism, or additional categories. The fiscal solvency 622 element contains a financial rating for the owner of the site, obtained from, for example, Dun & Bradstreet. An exemplary listing of fiscal solvency 622 settings is given in Table 6.

TABLE 6

| Rating | Net Worth or Equity |
|---|---|
| 5A | $50,000,000 and over |
| 4A | 10,000,000 to 49,999,999 |
| 3A | 1,000,000 to 9,999,999 |
| 2A | 750,000 to 999,999 |
| 1A | 500,000 to 749,999 |
| BA | 300,000 to 499,999 |
| BB | 200,000 to 299,999 |
| CB | 125,000 to 199,999 |
| CC | 75,000 to 124,999 |
| DC | 50,000 to 74,999 |
| DD | 35,000 to 49,999 |
| EE | 20,000 to 34,999 |
| FF | 10,000 to 19,999 |
| GG | 5,000 to 9,999 |
| HH | up to 4,999 |

Similarly, the company size 626 element contains a description of the size of the site-owner company. The company size 626 element is obtained from, for example, Dun & Bradstreet, in accordance with Table 7.

TABLE 7

| Rating | # Employees |
|---|---|
| ER1 | 1,000 or more |
| ER2 | 500-999 |
| ER3 | 100-499 |
| ER4 | 50-99 |
| ER5 | 20-49 |
| ER6 | 10-19 |
| ER7 | 5-9 |
| ER8 | 1-4 |
| ERN | Not Available |

The country code 626 element contains data regarding the location of the site-owner company, and is pulled, for example, from the WHOIS or another database. The domain create date 628 element contains the date the domain was created, and is pulled, for example, from the WHOIS database.

Figure 7:
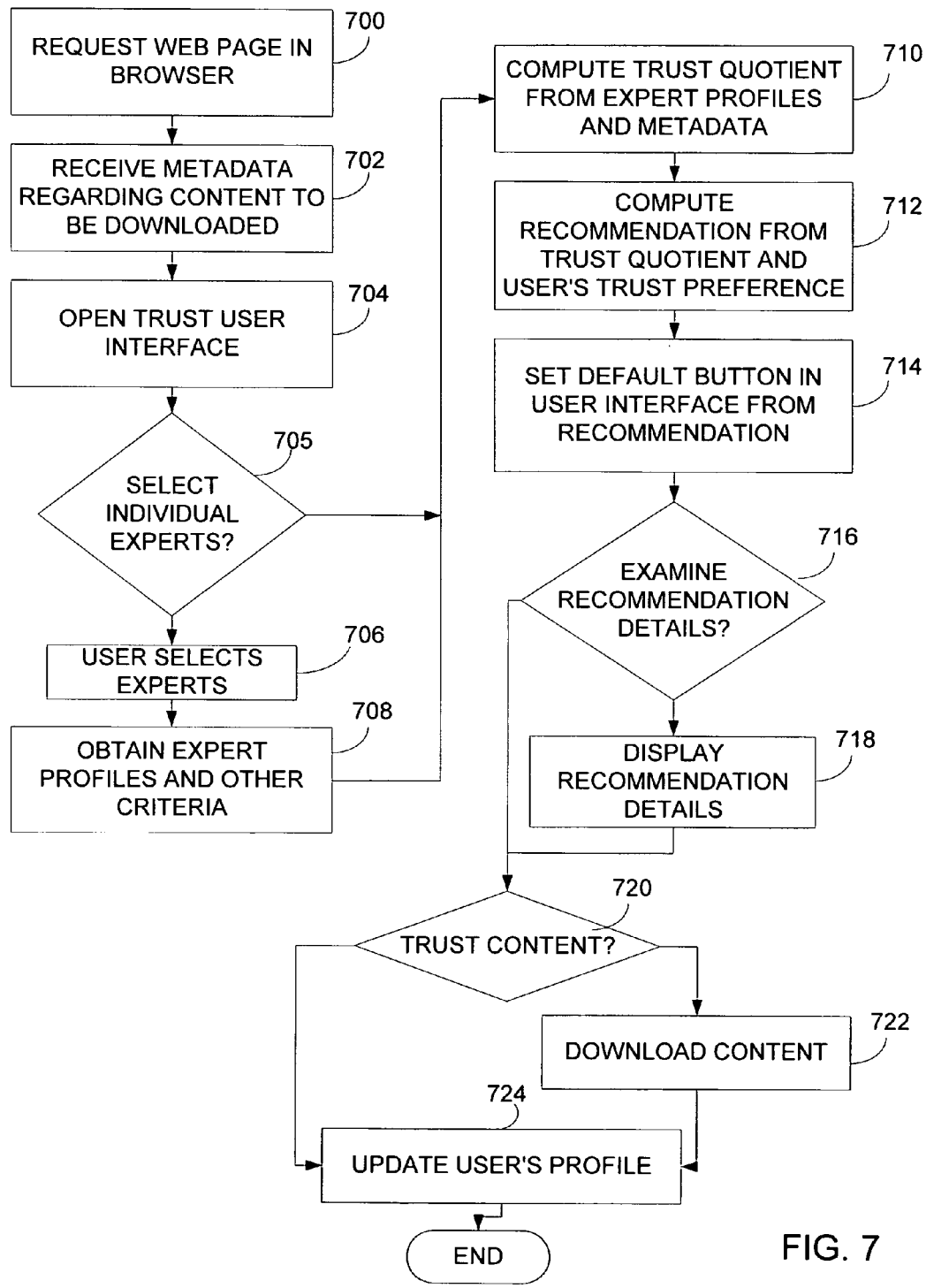
FIG. 7 is a flow diagram illustrating a method of recommending to a user whether or not to trust content for potential downloading, in accordance with an embodiment of the invention.

Turning attention to FIG. 7, a method is shown for using expert profiles to make a recommendation whether to download content in accordance with an embodiment of the invention. In this embodiment, a user uses a web browser to request content from remote computers; however, other embodiments are consistent with the principles of the invention. The user requests a web page at step 700. At step 702, the user receives metadata regarding content to be potentially downloaded. The metadata includes, for example, information about the size, type, creator, domain name of content provider, etc., and is preferably stored as an XML file. A trust user interface (e.g., dialog box) is opened for the user at step 704, from which the user decides whether to select individual experts at step 705. If the user chooses to select individual experts, he continues by selecting the experts at step 706 for inclusion in a recommendation decision. The recommendation module obtains profiles for the selected experts, along with other evaluating criteria, at step 708. The profiles are preferably obtained either from a locally stored cache of profiles and evaluation information, or from remote computers over a network. If the user chooses not to select individual experts at step 705, then a consensus or aggregate or preselected subset of experts is used in the recommendation decision. Using the profiles, metadata, and other information, the recommendation computes a trust quotient for the content at step 710. At step 712, the trust quotient is used along with the user's trust preferences to compute a recommendation for the user on whether or not to download the content. The recommendation is translated into a default button in the user interface at step 714, such that if the user hits the "Return" or "Enter" key, the recommended action is performed. The user chooses at step 716 whether to examine the details of the computed recommendation, including, for example, the weighting of the experts and the individual recommendations of the experts. If the user chooses to view them, these details are displayed at step 718. The user makes a choice whether or not to trust the content at step 720. If the user chooses to trust the content, it is downloaded at step 722. The user's profile is updated at step 724 with the trust decision made at step 720.

Figure 8:
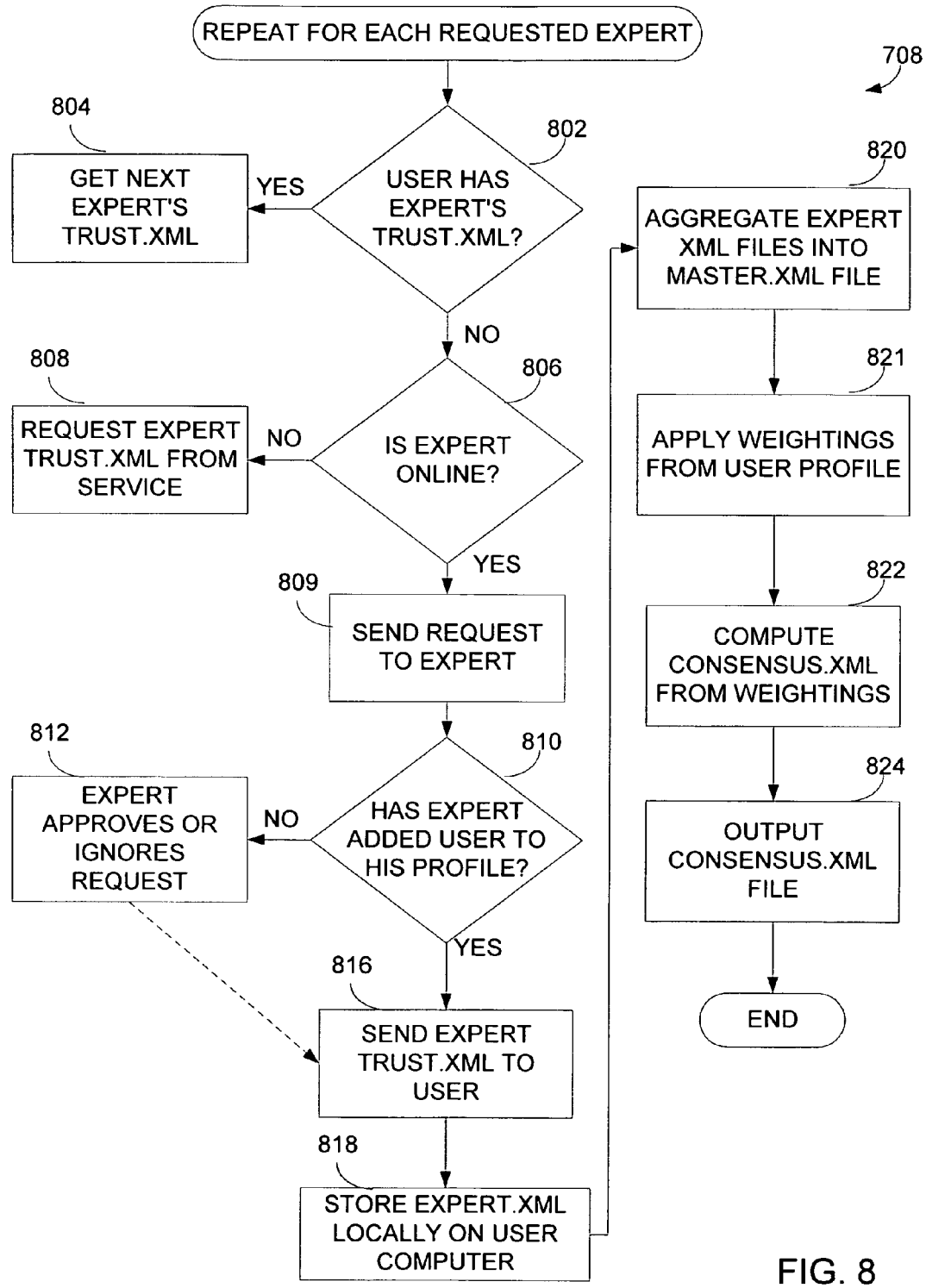
FIG. 8 is a flow diagram illustrating a method of obtaining from an expert an XML file for the expert's profile, in accordance with an embodiment of the invention.

Turning attention to FIG. 8, a method is shown for obtaining expert profiles in order to make a recommendation whether to download content, in accordance with an embodiment of the invention. In this embodiment, experts store their profiles as XML files for transmission to users. For each expert requested by the user at step 708 of FIG. 7, the user first checks if he has the expert's profile, stored as a trust.xml file, at step 802. If so, then the user proceeds to obtain the next user's trust.xml file at step 804. If not, then the user checks at step 806 if the expert is online. In some embodiments, a user interface indicates graphically whether the expert is currently online. If the expert is not online, then the user requests the expert's trust.xml file from a trust service, for later delivery, at step 808. If the expert is online, then the user sends a request to the expert at step 809. The expert is not obligated to send his trust.xml file to the user. The expert checks at step 810 if the user has been added to his profile. If not, the expert chooses at step 812 whether to approve the request or simply ignore it. If the request is approved, or if the user has already been added to the expert's profile, then the expert sends his trust.xml file to the user at step 816, labeled as "expert.xml". The user stores the expert.xml file on his local machine at step 818.

At step 820, after obtaining the requested experts' expert.xml files, the user aggregates the expert.xml files into a master.xml file, which includes individual expert names along with full trust.xml detail fro each expert. Master XML entries are preferably identifiable by expert. Weightings are applied to the master.xml entries at step 821 by using entries in the trust profile of the user. At step 822, the weightings are used to compute a consensus.xml file reflecting the weighted average of the experts. The consensus.xml file is output at step 824 and used to choose a default value for the download choice.

Figure 9:
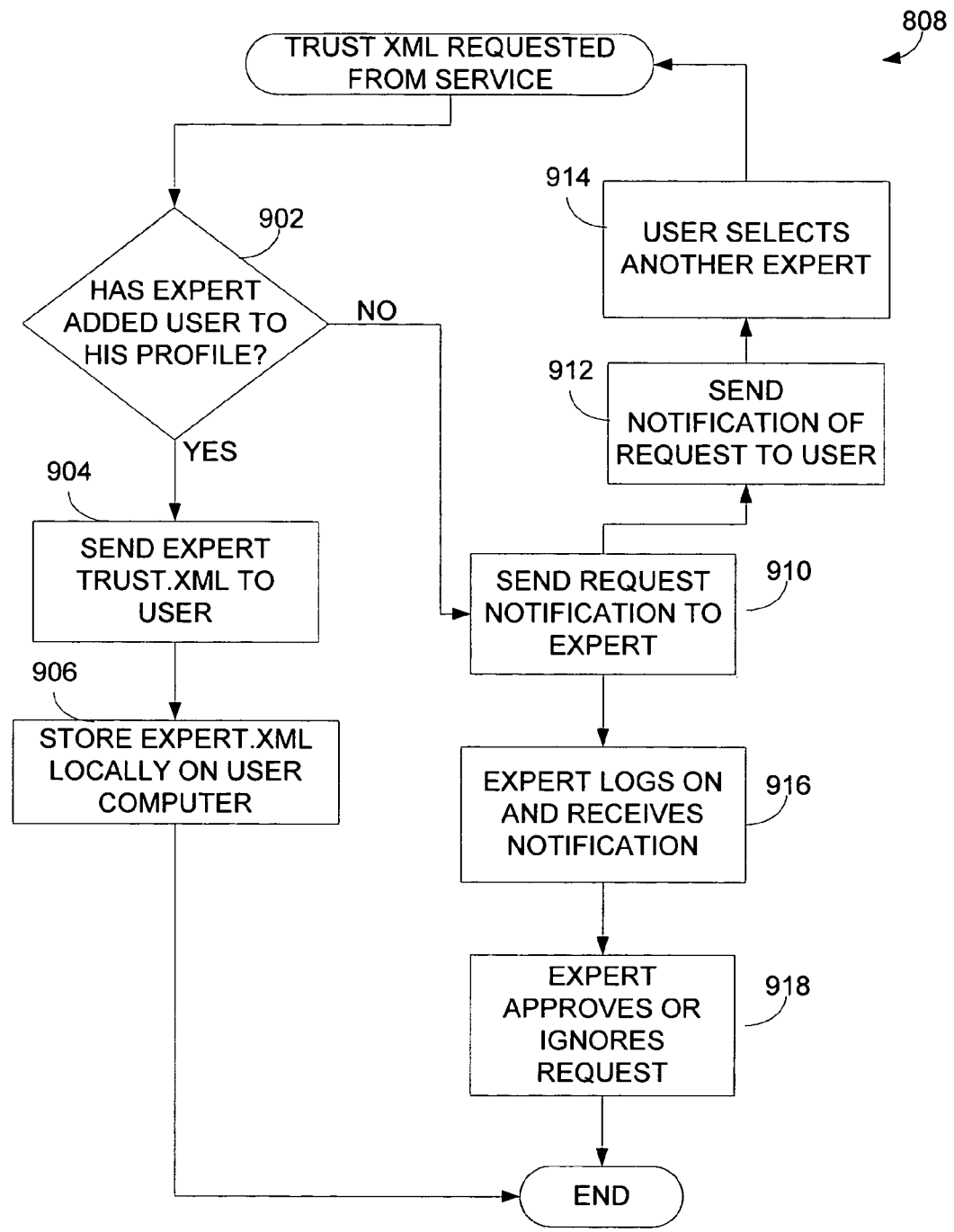
FIG. 9 is a flow diagram illustrating a method of obtaining via a network service an XML file for an expert profile, in accordance with an embodiment of the invention.

Turning attention to FIG. 9, a method is shown for obtaining expert profiles from a trust service in order to make a recommendation whether to download content, in accordance with an embodiment of the invention. In this embodiment, experts store their profiles as XML files for transmission to users, but additionally, the expert profiles are stored at a third party trust service. By using the trust service, a user requesting an expert profile can obtain or request the profile even if the expert is not online. For each trust.xml file requested by the user at step 808 of FIG. 8, the service first checks at step 902 if the expert has added the user to his profile, thereby agreeing to allow the particular user to access the expert's trust.xml file. If so, then the service sends the expert's trust.xml file, labeled "expert.xml", to the user at step 904, and the user stores the expert.xml file locally on his machine at step 906. If not, then the service sends a request notification to the expert at step 910 and sends a notification of the request to the user at step 912. The user then can select another expert at step 914. When the expert later logs on, he receives the notification at step 916. At step 918, the expert either approves the request, causing the service to send the trust.xml file to the user at step 904, or the expert ignores the request.

Embodiments of the invention are not limited to recommending whether or not to download content from the Internet. Embodiments also facilitate the recommending of whether or not to download content from a compact disc, hard drive, USB flash drive, or other storage device.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. In addition to recommending whether or not to download content from a remote computer, alternative embodiments of the invention facilitate recommending trust decisions with respect to actions to be taken on the local computer, such as launching executable files, changing system settings, etc. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method for recommending to a first computer user a decision for downloading content, the method implemented by the first user's computer comprising:
   at the first user's computer:
   reading a profile for the first user;
   receiving a selection of one or more experts from a listing of experts that is presented when the user is presented with an option of downloading the content, wherein each of the one or more selected experts comprises an individual user other than the first user;
   reading at least one expert profile associated with the one or more selected experts;
   assigning an amount of weight to the at least one expert profile in accordance with trust factors associated with the associated at least one expert profile,
   obtaining information about the content;
   computing a recommendation of whether or not to trust the content;
   providing said recommendation as a default option to the first user whether or not to trust the content, wherein the recommendation computation is based upon the profile for the first user, the at least one expert profile, the amount of weight assigned to the at least one expert profile, and the information about the content; and
   updating the trust factors associated with the at least one expert profile based on a third party's valuation of the at least one expert.

2. The method of claim 1 further comprising updating the first user profile based on a user decision whether or not to trust the content.

3. The method of claim 1 wherein the recommendation is based on a consensus of two or more expert profiles.

4. The method of claim 1 further comprising updating the trust factors associated with the at least one expert profile based on the at least one expert profile's consistency with the first user's decision history.

5. The method of claim 1 further comprising requesting the at least one expert profile to be transmitted from a source external to the first user's computer.

6. The method of claim 5 wherein the at least one expert profile is stored for transmission as an extensible markup language (XML) file.

7. The method of claim 1 further comprising transmitting the user profile to a remote computer in response to a request.

8. The method of claim 7 wherein the user profile is stored for transmission as an XML file.

9. One or more computer storage media having embodied thereon computer-executable instructions for performing a method of recommending to a first computer user a decision for downloading requested content, the method comprising:
   reading a profile for the first user;
   receiving a selection of one or more experts from a listing of experts that is presented when the user is presented with an option of downloading the content, wherein each of the one or more selected experts comprises an individual user other than the first user;
   reading at least one expert profile associated with the one or more selected experts;
   assigning an amount of weight to the at least one expert profile in accordance with trust factors associated with the associated at least one expert profile;
   obtaining information about the content;
   computing a recommendation of whether or not to trust the content;
   providing said recommendation as a default option to the first user whether or not to trust the content, wherein the recommendation computation is based upon the profile for the first user, the at least one expert profile, the amount of weight assigned to the at least one expert profile, and the information about the content; and
   updating the trust factors associated with the at least one expert profile based on a third party's valuation of the at least one expert.

10. The method of claim 9 further comprising updating the first user profile based on a user decision whether or not to trust the content.

11. The method of claim 9 wherein the recommendation is based on a consensus of two or more expert profiles.

12. The method of claim 9 further comprising updating the trust factors associated with the at least one expert profile based on the at least one expert profile's consistency with the first user's decision history.

13. The method of claim 9 further comprising requesting the at least one expert profile to be transmitted from a source external to the first user's computer.

14. The method of claim 13 wherein the at least one expert profile is stored for transmission as an extensible markup language (XML) file.

15. The method of claim 9 further comprising transmitting the user profile to a remote computer in response to a request.

16. The method of claim 15 wherein the user profile is stored for transmission as an XML file.

17. The method of claim 9 wherein the recommendation is provided by the first user's computer.

* * * * *

UNITED STATES PATENT AND TRADEMARK OFFICE
CERTIFICATE OF CORRECTION

PATENT NO.        : 7,617,519 B2                                                          Page 1 of 1
APPLICATION NO.   : 10/803364
DATED             : November 10, 2009
INVENTOR(S)       : Jeff Williams It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1041 days.

Signed and Sealed this

Nineteenth Day of October, 2010

David J. Kappos
*Director of the United States Patent and Trademark Office*